United States Patent
Masterov et al.

(10) Patent No.: US 8,223,913 B2
(45) Date of Patent: Jul. 17, 2012

(54) METHOD AND APPARATUS FOR DETECTING HIGH-ENERGY RADIATION USING A PULSE MODE ION CHAMBER

(75) Inventors: Michael Masterov, Houston, TX (US); Alexander Joseph Esin, Cedar Park, TX (US)

(73) Assignee: Thermo Fisher Scientific Inc., Sugar Land, TX (US)

( * ) Notice: Subject to any disclaimer, the term of this patent is extended or adjusted under 35 U.S.C. 154(b) by 1464 days.

(21) Appl. No.: 10/815,157

(22) Filed: Mar. 31, 2004

(65) Prior Publication Data

US 2005/0220246 A1    Oct. 6, 2005

(51) Int. Cl.
*G01T 3/00* (2006.01)
*G01T 1/18* (2006.01)
*G21C 17/00* (2006.01)
*H01J 47/00* (2006.01)

(52) U.S. Cl. ........ 376/154; 376/153; 376/255; 250/386; 250/379; 250/374

(58) Field of Classification Search .................. 376/154, 376/153, 255; 250/374, 379, 386
See application file for complete search history.

(56) References Cited

U.S. PATENT DOCUMENTS

| | | | |
|---|---|---|---|
| 2,581,305 A | | 1/1952 | Skellett |
| 2,756,345 A * | | 7/1956 | Replogle, et al. ............. 250/379 |
| 2,950,387 A | | 8/1960 | Brubaker |
| 3,045,123 A * | | 7/1962 | Frommer ..................... 250/565 |
| 3,319,066 A * | | 5/1967 | Gernert .......................... 250/386 |
| 3,335,277 A * | | 8/1967 | Hurlimann et al. ........... 250/375 |
| 3,873,840 A * | | 3/1975 | Ellis .............................. 250/392 |
| 3,921,012 A * | | 11/1975 | Marshall, III ................. 327/101 |
| 4,086,490 A | | 4/1978 | Todt, Sr. |
| 4,103,166 A | | 7/1978 | Niessel et al. |
| 4,225,290 A * | | 9/1980 | Allington ........................ 417/18 |
| 4,453,076 A * | | 6/1984 | Jackson et al. ................ 250/374 |
| 4,763,343 A * | | 8/1988 | Yanaki .......................... 378/110 |
| 5,327,029 A * | | 7/1994 | Ericson et al. ................ 327/350 |
| 5,905,262 A * | | 5/1999 | Spanswick .................... 250/368 |
| 6,353,324 B1 | | 3/2002 | Uber, III et al. |
| 6,889,152 B2 | | 5/2005 | More |

FOREIGN PATENT DOCUMENTS

GB    893907    4/1962
GB    1052523    12/1966

OTHER PUBLICATIONS

The Photo-Electric Effect, Experiment 2-8, Feb. 12, 2001, Available @ http://www.columbia.edu/cu/physics/pdf-files/Lab_2-08.pdf, Last Accessed Apr. 24, 2007.*

Chinese Office Action issued in Chinese Application No. 200510060075.X mailed on Aug. 25, 2006 and English Translation thereof, 6 pages.

(Continued)

*Primary Examiner* — James P Trammell
*Assistant Examiner* — Daniel L Greene
(74) *Attorney, Agent, or Firm* — Osha • Liang LLP (57) ABSTRACT

A method for measuring high-energy radiation includes applying a voltage pulse to electrodes in an ion chamber filled with a gas capable of forming charged ions by the high-energy radiation; measuring an ion current signal related to ion currents induced by the voltage pulse; and determining a magnitude of the high-energy radiation based on the ion current signal.

8 Claims, 4 Drawing Sheets

OTHER PUBLICATIONS

Herk Van M: "Physical aspects of a liquid-filled ionization chamber with pulsed polarizing voltage" Medical Physics, American Institute of Physics. New York, US, vol. 18, No. 4, Jul. 1, 1991, pp. 692-702, XP000259111, the whole document.

European Search Report issued in European Patent Application 05006959.0-2213, dated Feb. 28, 2006, 4 pages.

US Office Action issued in U.S. Appl. No. 11/049,360—mailed Oct. 31, 2006, 19 pages.

U.S. Office Action dated Apr. 19, 2007 issued in U.S. Appl. No. 11/049,360, 17 pages.

Office Action in Canadian Application No. 2,502,799 issued Feb. 2, 2011 (2 pages).

* cited by examiner

FIG. 1

PRIOR ART

METHOD AND APPARATUS FOR DETECTING HIGH-ENERGY RADIATION USING A PULSE MODE ION CHAMBER

CROSS-REFERENCE TO RELATED APPLICATIONS

Not Applicable.

BACKGROUND OF INVENTION

1. Field of the Invention

The invention relates generally to high-energy radiation monitoring and detection; more particularly, it relates to an ion chamber for detecting high-energy radiation.

2. Background Art

Figure 1:
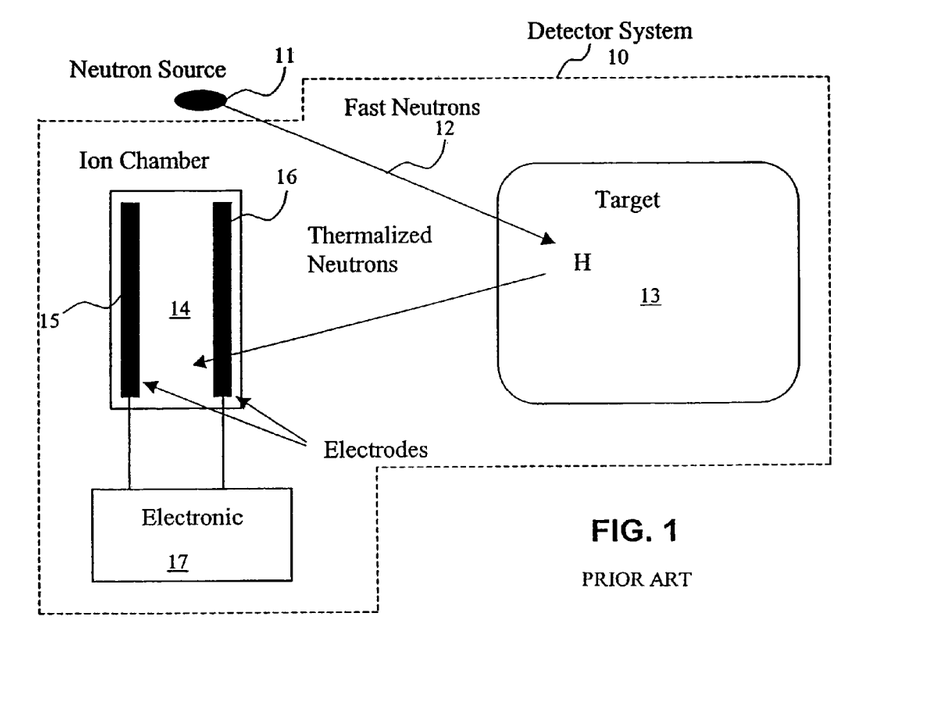
FIG. 1 shows a conventional neutron detection system

Detectors of high-energy and ionizing radiations are used in various applications. Such detectors, for example, include ion chambers, proportional counters, Geiger-Mueller counters, and scintillation counters. Among these, ion chambers are commonly used in neutron detectors. FIG. 1 shows a basic system for neutron detection that includes a target chamber 13, an ion chamber 14, and electronics. Fast neutrons 12 are produced by a neutron source 11. These fast neutrons 12 interact with hydrogen nuclei in the target chamber 13 until their velocity is reduced to the average thermal velocity of the target. The thermal (slow) neutrons are then scattered from the target 13 to the ion chamber 14.

In a typical neutron detector, the ion camber 14 is filled with a gas (such as He-3) that can interact with the thermalized neutrons to produce ions. When an He-3 atom absorbs (captures) a thermalized neutron, a nuclear reaction occurs and the resultant products are a fast-moving tritium (H-3) atom and a proton. These fast-moving particles travel through the gas, pulling electrons in their wake and thus creating an equal number of positive and negative ions. When a potential is applied across the electrodes 15, 16 in the ion chamber 14, the ions are swept to the electrodes of opposite charges, producing currents that are directly proportional to the number of ions transferred. The number of ions transferred to the electrodes depend on the rates of their formation and hence the neutron flux. Thus, the ion currents measured by the ion chamber may be used to derive the magnitudes of the neutron flux.

However, the ion currents generated in these processes are extremely small (on the order of $10^{-12}$ amp), making it very difficult to accurately determine neutron flux. In addition, temperature and humidity changes in various electronic components, cables, etc. can further compromise the accuracy of the measurements. The situation is even worse under field conditions, which often include wide variations in temperature and humidity.

Furthermore, instability in leakage currents can also significantly degrade the accuracy of repeat measurements. Leakage current is a current through the detector system that is not due to ion transport through the ion chamber 14. Leakage currents can be due to cables, connections, parasitic current in the components, moisture contamination of the amplifier circuit or other components, or any number of other factors. Thus, leakage current depends on a highly convoluted function of temperature, humidity, age of components, and any number of other factors. Because the ion current in an ion chamber is on the order of $10^{-12}$ amp or less, leakage current can be a significant fraction of the total measured current, and any variation in the leakage current can significantly impact the accuracy of the measurements.

While the prior art ion chambers are capable of providing satisfactory measurements, there remains a need for ion chambers that can provide more reliable and accurate measurements of high-energy radiations.

SUMMARY OF INVENTION

One aspect of the invention relates to methods for measuring an high-energy radiation. A method in accordance with one embodiment of the invention includes applying a voltage pulse to electrodes in an ion chamber filled with a gas capable of forming charged ions by the high-energy radiation; measuring an ion current signal related to ion currents induced by the voltage pulse; and determining a magnitude of the high-energy radiation based on the ion current signal.

One aspect of the invention relates to systems for measuring high-energy radiation. A system in accordance with one embodiment of the invention includes an ion chamber having an ionizable material that can be ionized by the high-energy radiation; two electrodes disposed in the ion chamber; and a circuit connected to the two electrodes, wherein the circuit is configured to provide a voltage pulse to the two electrodes and to measure an electrical signal across the two electrodes.

Other aspects and advantages of the invention will be apparent from the following description and the appended claims.

DETAILED DESCRIPTION

Embodiments of the invention relate to ion chambers for measuring high-energy radiations. "High-energy radiation" as used herein refers to neutron, X-ray, gamma ray, α particles, and β particles. For clarity of illustration, the following description uses an ion chamber for neutron detection as an example; however, embodiments of the invention are not so limited. An ion chamber for neutron counting in accordance with embodiments of the invention is operated in a pulse mode, as opposed to the conventional continuous mode.

FIG. 1 shows a conventional detector system 10 for neutron detection. As shown, neutron source 11 generates fast neutrons 12, a fraction of which will scatter into the target chamber 13, which may be filled with a hydrogenous material. "Hydrogenous material" refers to a material having hydrogen nuclei. The neutron source 11 is not part of the detector system 10. The fast neutrons 12 collide with the hydrogen nuclei in the target chamber 13. Hydrogen nuclei, with a similar mass as that of a neutron, are very efficient in slowing down the fast neutrons. As a result of the interactions with hydrogen nuclei, fast neutrons lose kinetic energy and become slower (thermal) neutrons. The thermal neutrons are scattered into an ion chamber 14. The ion chamber 14 is typically filled with a gas having nuclei that can capture thermal neutrons and undergo nuclear reactions after neutron capturing. Such nuclei include: boron (B-10, e.g., $BF_3$), lithium (Li-6), helium (He-3), uranium-233, uranium 235, and plutonium 239. Among these, He-3 gas has the advantage of having a large thermal neutron cross section (5330 barns) and, therefore, is commonly used in the ion chamber. The following description uses He-3 as an example. However, one of ordinary skill in the art would appreciate that embodiments of the invention are not so limited. In fact, embodiments of the invention may use any gas or other medium capable of ion transport that can produce ions by the high-energy radiation of interest.

As shown in FIG. 1, a typical ion chamber 14 includes two electrodes 15, 16, which may comprise a pair of parallel plates or any other convenient geometry. A potential is applied across the electrodes 15, 16 by an electronic module 17. While a box-shaped ion chamber is shown, one of ordinary skill in the art would appreciate that various configurations of the ion chambers may be used. For example, the ion chamber may be a cylinder with one electrode disposed on the inside surface of the cylinder and the other electrode placed at the axis (center) of the cylinder. He-3 gas in the ion chamber 14 normally serves as an insulator, and, therefore, no current (except for a small leakage current) is detectable between the two electrodes 15, 16 by the electronics module 17.

When an He-3 atom absorbs (captures) a thermal neutron, a nuclear reaction occurs as follows:

$$_2^3He + _0^1n \rightarrow _1^3H + _1^1p \qquad (1)$$

This nuclear reaction produces a tritium (H-3) atom and a proton. He-3 and H-3 are isotopes of helium and hydrogen, respectively. This reaction also releases an energy of approximately 764 keV (i.e., Q-value=764 keV), and, therefore, the tritium and the proton are produced with high kinetic energy. The tritium and proton travel at high speeds through the gas, pulling electrons in their wake to create an equal number of positive and negative ions. The positive and negative ions serve as charge carriers in the gas, which is otherwise an insulator.

If an electrical potential is applied across the electrodes 15, 16, the positive and negative ions will travel to the electrodes 15, 16 having the opposite charges. Such ion transports generate ion currents, which may be measured by the electronics module 17. The magnitudes of these ion currents are directly proportional to the number of ions transferred to the electrodes (these ions are then neutralized at the electrodes). The number of ions transferred is in turn proportional to the thermal neutron flux. Therefore, the ion currents measured by the electronics module 17 can be used to derive the magnitude of the thermal neutron flux through ion chamber 14.

The positive and negative ions generated in the ion chamber may also recombine to form a neutral species. This recombination competes with ion transport to the electrodes, and, thus, reduces the measurable magnitudes of the ion currents. In the absence of an applied potential across the ion chamber, there will be no ion transport and the positive and negative ions will eventually recombine. When an electrical potential is applied across the electrodes 15,16, the positive and negative ions are pulled in the opposite directions, reducing the probability of recombination. If the electrical potential applied across the electrodes 15, 16 is small, the positive and negative ions travel slowly to the electrodes, resulting in more recombination. If the potential applied across the electrodes 15, 16 is large, the ions travel quickly to the electrodes, resulting in less recombination. Thus, the electrical potential applied to the ion chamber has a direct effect on the magnitudes of the measurable ion currents.

Figure 2:
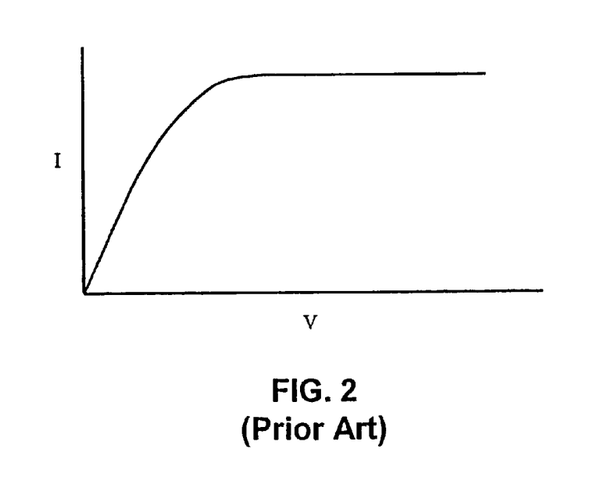
FIG. 2 shows a graph illustrating the relationship between the ion currents and the voltage applied to an ion chamber.

FIG. 2 illustrates a typical response curve of the measured ion currents (I) as a function of the potential (V) applied across the two electrodes in an ion chamber. As shown in FIG. 2, no net current flows in the absence of an applied potential. The positive ions and negative ions generated under this condition will eventually disappear by recombination. As the applied potential increases, the positive and negative ions are separated more rapidly. As a result, the recombination diminishes, and the ion current increases. At a sufficiently high potential, the recombination will be reduced to an insignificant level. Under this condition, essentially all positive and negative ions formed are swept to the electrodes. Increasing the applied potential further will not increase the ion currents, because the measured signal is limited by the ionization process. In this "saturation" region, the magnitudes of the ion currents are directly proportional to the rate of ionization, which is in turn a function of neutron flux. It is in this saturation region that a conventional ion chamber operates.

In theory, any current can be measured using a conventional ion chamber shown in FIG. 1. However, in real applications, the ion currents are very small, on the order of pico-amp ($10^{-12}$ A) or less, making it difficult to obtain accurate measurements. In addition, temperature and humidity drifts in the various electronic components, cables, etc. further reduce the accuracy of the measurements Furthermore, leakage currents, which occur between the two electrode plates (shown as 15, 16) through the insulator (e.g., the He-3 gas in the ion chamber), may complicate the measurements.

Figure 3A:
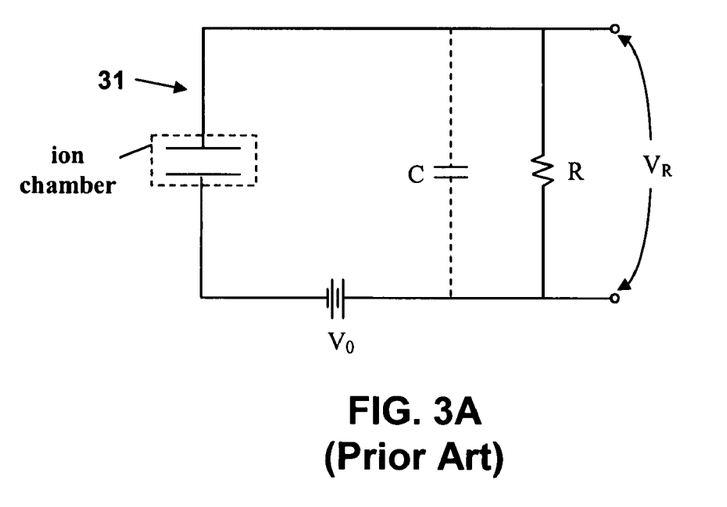
FIG. 3A shows a prior art circuit for a continuous mode operation.

FIG. 3A shows a conventional circuit 31 that may be used to operate an ion chamber. As shown, C represent the capacitance of the chamber plus any parallel capacitance, and $V_R$ represents the output pulse, which is related to the voltage across the load resistance R. In the absence of any ionization in the ion chamber, this signal voltage is zero (except for a small signal due to the leakage current), and all the applied voltage $V_0$ appears across the ionization chamber itself. When ionization occurs, the ion current will reduce the ion chamber voltage from its equilibrium value of $V_0$. A voltage corresponding to the amount by which the ion chamber voltage is reduced appears across the load resistance R. The voltage across the load resistance R reaches its maximum when all ions are collected by the electrodes. Afterwards, the ion chamber voltage increases and eventually returns to its equilibrium voltage $V_0$.

In a conventional setup described above, the ion chamber (or counter) is maintained at an equilibrium voltage $V_0$ (i.e., constant voltage mode) so that it is ready to detect constant flux of high-energy radiation (e.g., the ion chamber for detecting neutron flux shown in FIG. 1) or pulses of high-energy radiation (e.g., proportional counters or Geiger-Mueller counters for detecting gamma rays). In contrast, embodiments of the invention use ion chambers in a pulsed voltage mode, in which the potential applied across the electrodes in the ion chamber is pulsed. That is, an ion chamber in accordance with embodiments of the invention is not maintained at an equilibrium voltage. Embodiments of the invention may use pulses of ion transport drive voltages (i.e., voltage pulses) to monitor or measure neutron flux or other ion generation in a steady state.

Figure 3B:
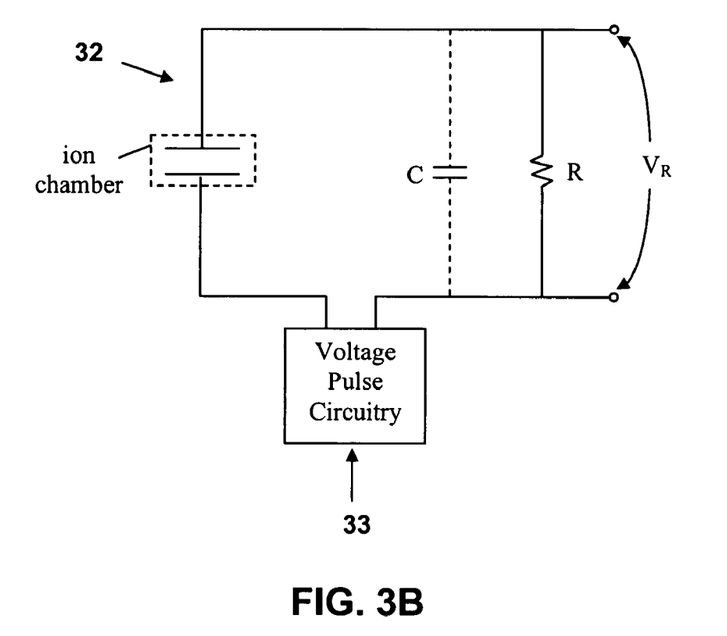
FIG. 3B shows a circuit for a pulse mode operation in accordance with one embodiment of the invention.

FIG. 3B shows a circuit 32 that may be used with embodiments of the invention. As shown, the circuit 32 in FIG. 3B is substantially the same as the circuit 31 in FIG. 3A, except that a voltage pulse circuitry 33 in FIG. 3B has replaced the constant voltage supply $V_0$ in FIG. 3A. The voltage pulse circuitry 33, which may be any voltage pulse circuitry known in the art or yet to be developed, can provide an ion transport drive voltage to the ion chamber for a selected duration (i.e., a voltage pulse). In addition, the voltage pulse circuitry 33 may be used to provide a ramping voltage (or other shaped voltage pulse) to the ion chamber, to be described later.

Figure 4:
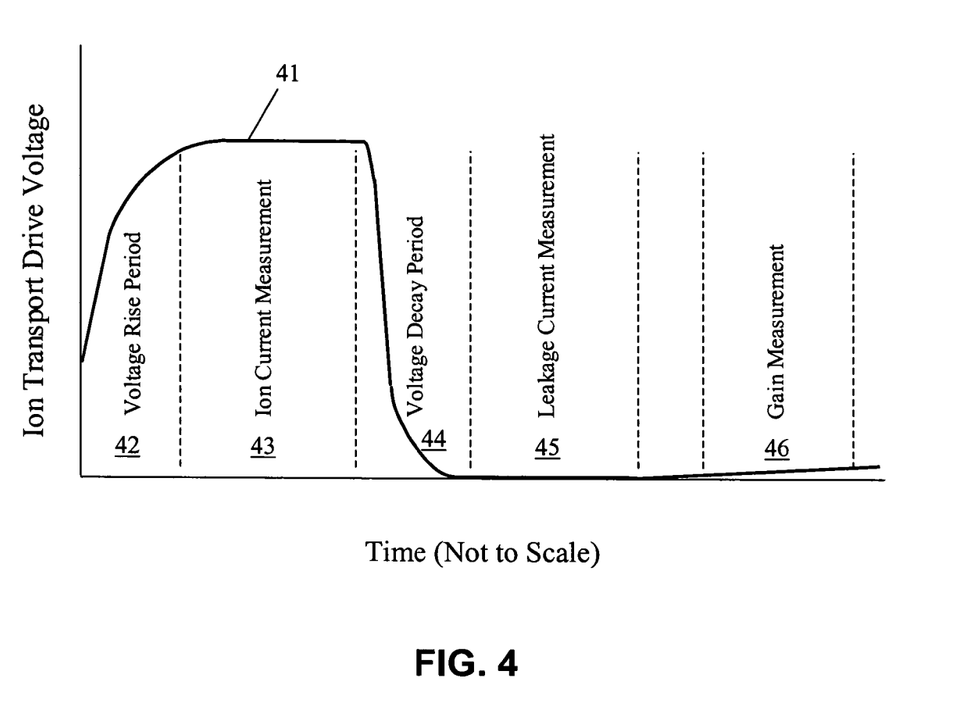
FIG. 4 shows a voltage curve as a function of time in a pulse mode operation in accordance with one embodiment of the invention.

In accordance with a method of the invention, the ion transport drive voltage (i.e., the potential applied across the electrodes in the ion chamber) is applied, allowed to stabilize for a selected duration, and then turned off, as shown in FIG. 4. The voltage curve as a function of time is shown as 41, which may be dissected into several time periods. As shown, in period 42, the ion transport drive voltage gradually increases as the ion transport voltage is applied. Eventually the drive voltage reaches a maximum in period 43. During period 43, charged ions in the ion chamber, which are formed by the neutron flux before the drive voltage is applied, are pulled to the electrodes with opposite charges, creating ion currents. The ion currents can then be detected as voltage signals ($V_R$) across the load resistance R. Note that the magnitude of a voltage signal ($V_R$) measured during period 43 may include that from the ion current generated by the neutron flux and that from the leakage current.

Once the ion current measurement is complete (or after the selected duration), the drive voltage supplied to the electrodes in the ion chamber is turned off, which results in voltage decay in period 44. The drive voltage eventually decays to zero. The rate of this decay is determined by the time constant RC of the circuitry. The drive voltage is kept off for the time period 45, during which no signal from ion transport should be detectable.

Another measurement may be taken during period 45. This measurement would correspond to the leakage current. The difference between the measurements obtained in periods 43 and 45 may be used to derive the desired measurement—the current due only to ion transport and thus directly related to neutron flux through the ion chamber.

The leakage current may be measured for every measurement cycle such that the leakage current reference is only seconds or fractions of a second old. Temperature, humidity, and long term drift effects operate on much longer time scales, and, thus, remain substantially constant between measurements. Accordingly, these slowly changing effects are cancelled out in the difference measurements. Because the leakage currents may be on the same order of magnitude as the ion transport currents, subtracting the leakage currents from the raw measurements may provide a dramatic improvement to the repeatability and accuracy of the ion current measurements.

Figure 5:
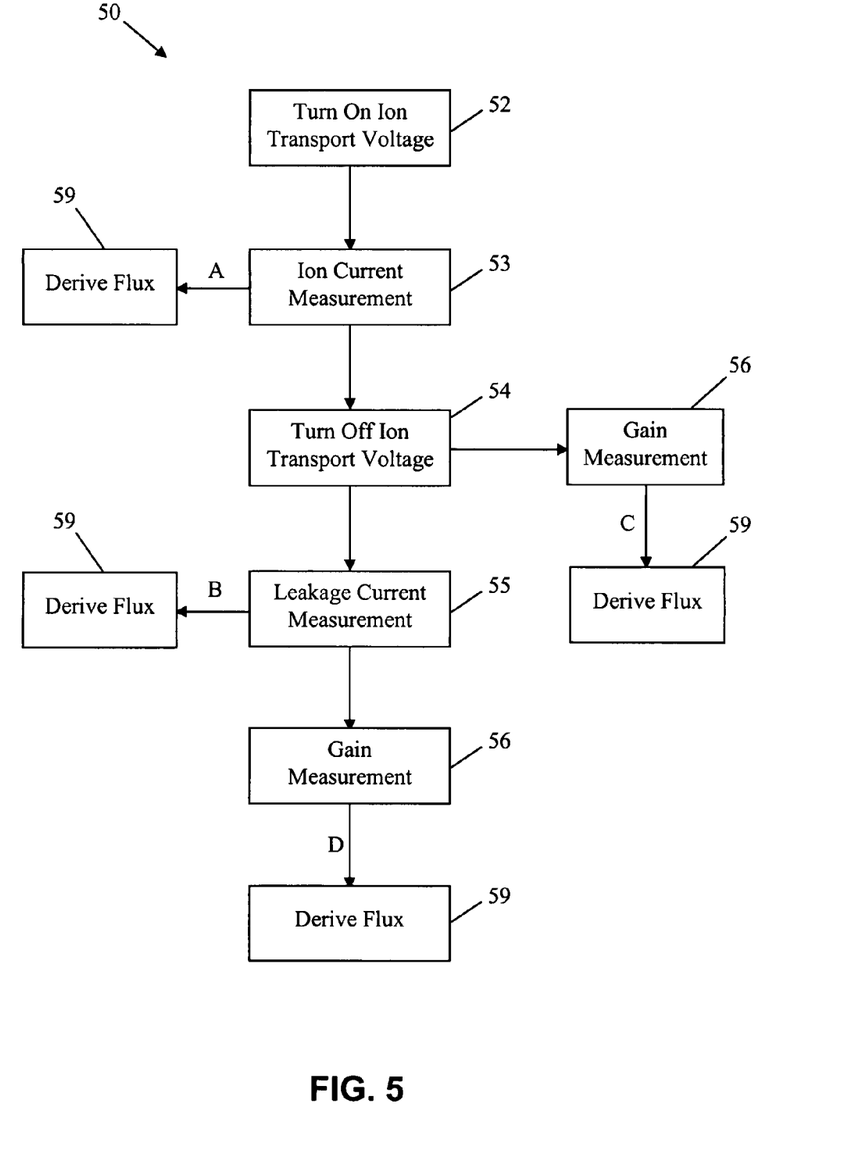
FIG. 5 shows a flow chart illustrating several methods for detecting high-energy radiation in accordance with embodiments of the invention.

Some methods of the invention for ion transport measurements are illustrated as a flow chart 50 in FIG. 5. The method described above corresponds to method B in FIG. 5. Method B includes the steps of turning on ion transport voltage (step 52), measuring ion currents (step 53), turning off ion transport voltage (step 54), and measuring the leakage current after the ion transport voltage is turned off (step 55). The difference between the measurements taken in step 53 and 55 is then used to derive the ion currents that result from neutron flux (step 59).

In accordance with some embodiments of the invention, the gain of the amplifier in the circuit can also be measured and calibrated. To do this, a very small voltage ramp (or other characteristic non-DC pulse) is applied to the ion chamber, during period 46. This voltage is much too small to drive ion transport, but the ion chamber will act as a capacitor and thus there will be a small current. As long as the capacitance of the ion chamber does not change (given that the geometry is fixed and the gas is inert, changes are unlikely), the input to the amplifier will be the leakage current (which is measured as described above) plus the calibration current (which is known). Thus, the gain can be easily computed and adjusted so that the measurements to be compared are obtained with the same gain. Alternatively, the gain thus obtained may be used to calibrate (adjust) the ion current measurements so that they are of the same gain before a difference between two measurements is obtained.

This method is illustrated as method D in FIG. 5. Method D includes the steps of turning on ion transport voltage (step 52), measuring ion currents (step 53), turning off ion transport voltage (step 54), measuring leakage current (step 55), and measuring the gain (step 56). The gain obtained in step 56 may be used to control the measurements during signal acquisition or before a difference measurement is derived from the measurements made in step 53 and 55. The difference measurement may then be used to derive the ion current.

Some embodiments of the invention use a simpler approach, which does not measure leakage currents (i.e., skipping period 45 in FIG. 4). A method in accordance with such embodiments of the invention assumes that the gain of the signal amplifier does not change within the short period when the measurements are made. The measurement with the electrical field (ion chamber potential) turned on (period 43 in FIG. 4) corresponds to the sum of the ion transport current and the leakage current. The measurement with the very small voltage ramp (period 46 in FIG. 4) corresponds to the calibration current plus the leakage current. The difference between these two measurements gives the signal current (ion transport current) minus the (known) reference current. Therefore, the ion transport currents may be derived from the difference measurements.

When the magnitude of the signal current (ion transport current) equals that of the reference current, the difference is zero, and thus any drift in gain is irrelevant. However, when there is a substantial difference between the magnitudes of the signal and reference currents, gain drift may result in errors. Thus, this method may be less accurate than the methods described above. However, as noted above, the gain may be separately calibrated from the signals measured during period 46 and used to improve the accuracy of the ion transport measurements, if so desired.

A method corresponding to this approach is illustrated as method C in FIG. 5. Method C includes the steps of turning on ion transport voltage (step 52), measuring ion currents (step 53), turning off ion transport voltage (step 54), and measuring the gain (step 56). The difference between the measurements taken in step 53 and 56 is then used to derive the ion currents that result from neutron flux (step 59).

In all embodiments described above (e.g., methods B, C, and D in FIG. 5), the ion current is measured (step 53). In addition, the leakage current (step 55), gain calibration current (step 56), or both may be measured, depending on the methods used. In accordance with some embodiments of the invention, only the ion current is measured and no compensation for the leakage current is provided. This method is illustrated as method A in FIG. 5, which includes three steps: turning on ion transport voltage (step 52), measuring ion currents (step 53), and deriving neutron flux from the measurement taken in step 53 (step 59).

At a first glance, it might seem that this method (Method A in FIG. 5) offers no advantage over the conventional continuous mode measurement; however, it is not so. In a pulse mode measurement, the current will, all else being equal, be greater, thus making errors due to leakage current proportionally less important. The reason for this is explained in a later section.

The flow chart 50 in FIG. 5 illustrates several methods for ion transport measurement in accordance with embodiments of the invention. The methods shown are for illustration only. One of ordinary skill in the art would appreciate that other modifications are possible without departing from the scope of the invention. For example, these methods may be used in combination and the results can be cross checked for accuracy or for quality control. For example, unexpected change in the gain of the system may be identified from an unexpected discrepancy between the results from methods B and D. Similarly, the magnitudes of leakage currents may be inferred from a comparison between results obtained from methods C and D.

In order to understand the additional advantages of a pulse mode operation, it is necessary to consider the reaction kinetics of the system. Under normal conditions, vast majority of the gas atoms in the ion chamber are unionized He-3. Thus, the concentration of the He-3 gas remains substantially constant, and form Equation (1), the rate of ion production depends linearly on only the neutron flux.

As note above, ions are consumed by two independent mechanisms—ion current flow (ion transport to the electrodes) and recombination. When an electric field is applied across the ion chamber, the ions are current (charge) carriers and are neutralized when they reach the electrodes When an ion collides with an unionized atom, a charge transfer may occur, but the total number of ions does not change. The driving force for ion transport is the applied electric field. When the potential is held constant, the rate of ion consumption is linearly dependent on (first order in) the ion concentration. When no electric field is applied, this ion consumption term goes to zero.

In order for an ion to be neutralized in the gas (recombination) rather than at the electrode, it must collide with an ion having an opposite charge. The probability of such collision depends on the concentrations of the positive ions and the negative ions. Therefore, the recombination reaction is subject to the second order kinetics, one order each on the concentrations of the positive ions and the negative ions. Accordingly, ion recombination is insignificant when the ion concentrations are low, and it will become significant when the ion concentrations are high. This ion consumption (recombination) term is independent of the applied electric field.

When the concentration of ions is small, the ion consumption term with the first order kinetics (i.e., current flow to the electrodes) dominates, and the ion consumption term with the second order kinetics (i.e., recombination) is relatively small. If the electric field is applied continuously (as in the convention constant voltage operation), the ion chamber comes to an equilibrium, in which the rate of ion consumption by the current flow accounts for a large fraction of the ions produced by neutron flux, and the rate of consumption by recombination is relatively small.

If the electric field is applied intermittently (e.g., in a pulse mode), the above described equilibrium does not occur. When the field is turned off, ion consumption by current flow stops. Ion concentration increases because ion production by neutron interactions continues, but ion consumption by recombination is insignificant and will remain insignificant until ion concentrations increase substantially. Eventually an equilibrium will be reached when ion consumption by recombination equals ion production by neutron flux, but this will take a relatively long time.

When the ion transport voltage is turned on, initial current flow will be high (relative to current flow with a continuous field) because ion concentration will have had time to build up. The larger current will be easier to measure, and the leakage current will be relatively small. Thus, the simple method A in FIG. 5 will produce a result more accurate than the conventional constant current mode can.

At the first glance, it may seem possible to make the ion current very large in a pulse mode by making the duty cycle (the fraction of time when the electric field is applied to the total cycle time) very small, but this is not the case for the following reasons. First, there is a practical minimum time required to measure the ion current. Second, some ions will be consumed by ion transport before the voltage stabilizes (see period 42 in FIG. 4). Third, more ions are lost to recombination when ion concentration increases. Finally, the statistical fluctuation in measurement is increased since the total number of ions is reduced. Thus, a cycle time and duty cycle are preferably selected such that the statistical uncertainty (due to the physics of neutron production) equals the measurement uncertainty (due to the limitations of the electronics). This will allow for minimum uncertainty of measurement.

The above description illustrates embodiments of the invention as applied to ion chambers designed to detect neutrons. However, as noted above, embodiments of the invention are not limited to neutron detection. Instead, a pulse mode operation in accordance with embodiments of the invention is also applicable to ion chambers that are designed to detect other forms of high-energy radiation, such as gamma rays, X-rays, $\alpha$ particles and $\beta$ particles.

For example, the high energy photons (or electromagnetic waves) from, for example, X-ray or gamma ray, may pass through the ion chamber wall (or window) and be absorbed by or interact with (or Compton scattered from) electrons in the gas molecules, producing high energy electrons. The resultant high-energy electrons would then form multiple ions by collision with electrons in other gas molecules. The net result is the generation of ions at a rate proportional to the high energy photon (or electromagnetic wave) flux. Once the ions are generated, other aspects of the operation of the device are the same as described above.

Advantages of the invention may include one or more of the following. Embodiments of the invention can be used to provide more accurate measurements of high-energy radiation. The pulse mode operation can produce stronger signals than can a conventional constant voltage operation. Several methods can be used to derive the ion transport currents from the pulse mode operation. In addition, it is relatively easy to correct for leakage currents or to calibrate the gain of the system. Methods of the invention also provide convenient ways for quality control or monitoring of leakage currents and system gains. Furthermore, without constantly loading the system with a high voltage, the device will not wear out as quickly and less energy is consumed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for measuring high-energy radiation flux, comprising:
    applying a voltage pulse for a predetermined time between electrodes in an ion chamber, wherein the ion chamber is filled with a gas capable of forming charged ions by high-energy radiation;
    measuring an ion current signal related to ion currents induced by the voltage pulse while the voltage pulse is being applied to the electrodes;

measuring a leakage current signal after the voltage pulse has been turned off, after ion transport has stopped, and after measuring the ion current signal;

determining a magnitude of the high-energy radiation flux dependent on the ion current signal and the leakage current signal after measuring the leakage current signal; and outputting the result of the magnitude of the high-energy radiation flux.

2. The method of claim 1, wherein the determining the magnitude of the high-energy radiation flux comprises subtracting the leakage current signal from the ion current signal.

3. The method of claim 1, further comprising determining a gain of an amplifier of the ion current signal and the leakage current signal.

4. The method of claim 3, wherein the determining the gain of the amplifier comprises applying a ramping voltage between the electrodes in the ion chamber.

5. The method of claim 3, wherein one of a magnitude of the ion current signal and a magnitude of the leakage current signal is adjusted dependent on the gain of the amplifier.

6. The method of claim 5, wherein the subtracting the leakage current signal from the ion current signal is dependent on one of a magnitude-adjusted ion current signal and a magnitude-adjusted leakage current signal.

7. The method of claim 1, further comprising determining a gain of an amplifier of the ion current signal and the leakage current signal, wherein the magnitude of the high-energy radiation flux is proportional to the ion current signal and the gain of the amplifier.

8. The method of claim 7, wherein the determining the gain of the amplifier comprises applying a ramping voltage between the electrodes.

* * * * *